US009556977B2

(12) United States Patent
McNab

(10) Patent No.: US 9,556,977 B2
(45) Date of Patent: Jan. 31, 2017

(54) APPARATUS FOR FLEXIBLE PIPE BODY AND METHOD OF PRODUCING SAME

(71) Applicant: Wellstream International Limited, Newcastle-upon-Tyne (GB)

(72) Inventor: John Cross McNab, Newcastle-upon-Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 203 days.

(21) Appl. No.: 14/046,680

(22) Filed: Oct. 4, 2013

(65) Prior Publication Data
US 2014/0116564 A1   May 1, 2014

(30) Foreign Application Priority Data

Oct. 25, 2012 (EP) .................................. 12190000

(51) Int. Cl.
*F16L 55/00* (2006.01)
*F16L 11/00* (2006.01)
*E21B 47/12* (2012.01)
*E21B 17/01* (2006.01)
*E21B 17/10* (2006.01)
*G01M 11/08* (2006.01)
*G01L 1/24* (2006.01)
(Continued)

(52) U.S. Cl.
CPC .............. *F16L 11/00* (2013.01); *E21B 17/01* (2013.01); *E21B 17/1035* (2013.01); *E21B 47/123* (2013.01); *F16L 11/082* (2013.01); *G01L 1/242* (2013.01); *G01M 11/086* (2013.01); *G01D 11/24* (2013.01); *Y10T 29/49428* (2015.01)

(58) Field of Classification Search
USPC ................................ 138/129, 108, 116, 104
See application file for complete search history.

(56) References Cited

U.S. PATENT DOCUMENTS 3,715,458 A * 2/1973 Bayes ..................... H01B 7/40
                                                    174/113 R
4,402,346 A * 9/1983 Cheetham ............. F16L 11/083
                                                    138/103
(Continued)

FOREIGN PATENT DOCUMENTS

WO   WO2009/068907   6/2009

OTHER PUBLICATIONS

Search Report from the European Patent Office for corresponding European Application No. EP12190000.5-1605, Mar. 31, 2013, 6 pages.
(Continued)

*Primary Examiner* — James Hook
(74) *Attorney, Agent, or Firm* — Klarquist Sparkman, LLP

(57) ABSTRACT

A sheath apparatus for housing tubes and/or cables, for incorporation into a flexible pipe body, including: an elongate body portion, comprising an outer surface and a channel for receiving a tube or cable within the body portion, and further comprising at least one opening connecting the channel and the outer surface, wherein the at least one opening comprises a continuous opening extending along the elongate body portion or a plurality of discrete openings at predetermined positions along the elongate body portion, and wherein the channel defines an inner surface of the body portion for contacting the tube or cable.

11 Claims, 5 Drawing Sheets

(51) Int. Cl.
*F16L 11/08* (2006.01)
*G01D 11/24* (2006.01)

(56) References Cited

U.S. PATENT DOCUMENTS

| | | | | |
|---|---|---|---|---|
| 4,620,569 | A * | 11/1986 | von Glanstatten | F16L 11/081 138/121 |
| 5,668,912 | A * | 9/1997 | Keller | G02B 6/4403 385/100 |
| 5,996,641 | A * | 12/1999 | Chen | F16L 11/081 138/122 |
| 6,691,743 | B2 * | 2/2004 | Espinasse | F16L 11/16 138/127 |
| 6,899,140 | B2 * | 5/2005 | Fraser | F16L 9/121 138/129 |
| 7,397,993 | B1 * | 7/2008 | Nave | G02B 6/4403 174/117 F |
| 7,781,040 | B2 * | 8/2010 | Coyle | F16L 11/081 138/129 |
| 8,459,965 | B2 * | 6/2013 | Morris | B29C 47/0028 138/115 |
| 2004/0168521 | A1 | 9/2004 | Andersen | |
| 2008/0271926 | A1 | 11/2008 | Coronado et al. | |
| 2010/0089478 | A1 | 4/2010 | Gudme | |
| 2011/0030831 | A1 * | 2/2011 | Clements | E21B 17/015 138/109 |
| 2012/0012221 | A1 * | 1/2012 | Queau | F16L 59/141 138/129 |
| 2012/0111104 | A1 | 5/2012 | Taverner et al. | |
| 2013/0220468 | A1 * | 8/2013 | Weppenaar | E21B 47/0006 138/104 |
| 2014/0137974 | A1 * | 5/2014 | Lunceford | H02G 3/266 138/108 |
| 2014/0230946 | A1 * | 8/2014 | Procida | F16L 59/153 138/129 |

OTHER PUBLICATIONS

English Translation of First Office Action and Search Report from State Intellectual Property Office of People's Republic of China for corresponding Chinese Application No. 201310503800.0, Sep. 27, 2016, 11 pages.

* cited by examiner

APPARATUS FOR FLEXIBLE PIPE BODY AND METHOD OF PRODUCING SAME

CROSS REFERENCE TO RELATED APPLICATION

This application claims priority to European patent no. EP12190000.5, filed Oct. 25, 2012, which is incorporated herein by reference.

FIELD

The present invention relates to an apparatus for a flexible pipe body and a method of producing the same. In particular, but not exclusively, the present invention relates to apparatus for housing tubes or cables within a flexible pipe body for performing functions such as sensing of parameters associated with a flexible pipe.

BACKGROUND

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wired forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the armour layers of the flexible pipe body is increased.

It will be appreciated that harsh environmental conditions are present at such operating depths under the sea, including not only high pressures and strong tidal movement but also man made conditions such as collision with passing vehicles and so on.

Flexible pipe may also be used for shallow water applications (for example less than around 500 meters depth) or even for shore (overland) applications.

For any depth of use, there is an increasing desire for the continual monitoring of various parameters of flexible pipes, such as strain, temperature and acoustics, to help detect structural failures in the pipe. Such structural failure could be leakage, wire breakage, over-bending in the pipe (i.e. bending past the maximum allowable amount before which damage will occur), and interaction between the pipe and external environment such as collisions with other objects, for example.

One way which has been suggested for monitoring parameters associated with such structures is the use of an optical fibre system. As a method of monitoring strain, temperature and acoustics in flexible pipe, bare fibres and/or fibres in metal tubes (FIMT) within a protective conduit have been incorporated along the length of the pipe structure and connected to an interrogating device external of the pipe. The fibre is used as an optical fibre for transmitting light and is generally made of glass. The optical fibres can be used as strain gauges, temperature gauges, temperature indicators and strain measurements can be made which are either localised, distributed or semi-distributed depending upon the manner in which the optical fibre is interrogated and regions/sensors in the optical fibre are arranged. The fibres may include Bragg Gratings whereby differential diffraction of light passing down the fibre is used to measure the necessary parameter. Output readings can be analysed to determine the conditions of the pipe over a time period and corrective action can be taken accordingly. WO2009/068907 discloses a way in which an optical fibre can be wrapped around a flexible pipe and certain measurements taken from which parameters associated with the pipe can be determined.

Strain can be monitored by including a FIMT that is bonded to the conduit. Temperature can be monitored by including a FIMT that is not bonded to the inside of the conduit, and is therefore able to record temperature independently to strain. Fibres can be configured in a similar manner to monitor acoustic conditions.

Assembling the FIMT, and their eventual removal from the wire at the end fitting stage to enable their connection to the interrogating device, are the challenges faced with the known methods. In terms of preparation, finding an appropriate location within the flexible pipe, and the manufacturing technique itself may be problematic. At pipe completion when the end fitting is assembled, the FIMT must be separated to facilitate its connection to an external device. If the FIMT is bonded into an armour wire, for example, removing it from the wire is difficult and can induce unnecessary stress in the material. Similar challenges may arise with other types of sensing device, such as electrical cables, and the like.

SUMMARY

According to a first aspect of the present invention there is provided a sheath apparatus for housing tubes and/or cables, for incorporation into a flexible pipe body, comprising:

an elongate body portion, comprising an outer surface and a channel for receiving a tube or cable within the body portion, and further comprising at least one opening connecting the channel and the outer surface, wherein the at least one opening comprises a continuous opening extending along the elongate body portion or a plurality of discrete openings at predetermined positions along the elongate body portion, and wherein the channel defines an inner surface of the body portion for contacting the tube or cable.

According to a second aspect of the present invention there is provided a method of manufacturing a sheathed tube or cable for a flexible pipe body, comprising: forming a sheath apparatus by forming an elongate body portion, comprising an outer surface, a channel, and at least one opening connecting the channel and the outer surface, wherein the at least one opening comprises a continuous opening extending along the elongate body portion or a plurality of discrete openings at predetermined positions along the elongate body portion, and wherein the channel defines an inner surface of the body portion; and inserting a tube or cable into the channel to contact the inner surface of the body portion.

According to a third aspect of the present invention there is provided a sheath apparatus substantially as herein described with reference to the drawings.

According to a fourth aspect of the present invention there is provided a method substantially as herein described with reference to the drawings.

Certain embodiments of the invention provide the advantage that a tube, FIMT and/or a cable or the like can be incorporated into a flexible pipe body relatively cheaply and conveniently compared to known arrangements. The tube, FIMT and/or a cable or the like may be used as a sensing device.

Certain embodiments of the invention enable a parameter such as strain, temperature or acoustics to be monitored in a flexible pipe continuously or repeatedly, at desired times or when triggered by the occurrence of a predetermined event. Certain embodiments enable an event such as a breach of a flexible pipe to be detected and monitored.

Certain embodiments of the invention provide the advantage that a sensing tube or cable that requires electrical isolation from surrounding elements of a flexible pipe can be conveniently housed to have such electrical isolation yet accessible to fluids that may be present in an annulus region of the flexible pipe that require monitoring.

The foregoing and other objects, features, and advantages of the invention will become more apparent from the following detailed description, which proceeds with reference to the accompanying figures.

BRIEF DESCRIPTION OF THE DRAWINGS

In the drawings like reference numerals refer to like parts.

DETAILED DESCRIPTION

Figure 1:
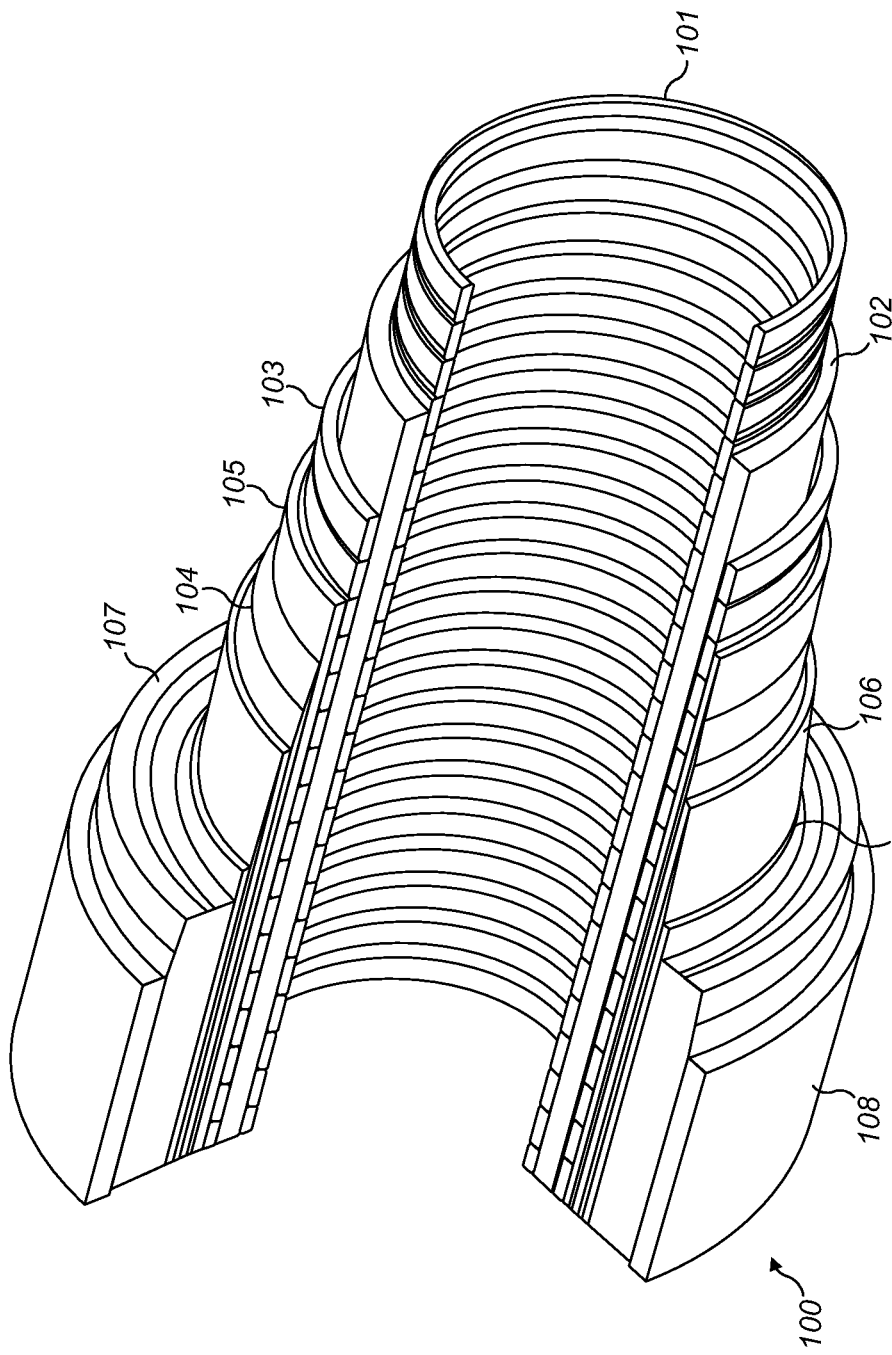
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layer is often formed from a plurality of metallic wires (to impart strength to the layer) that are located over an inner layer and are helically wound along the length of the pipe at between about 10° to 55°. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
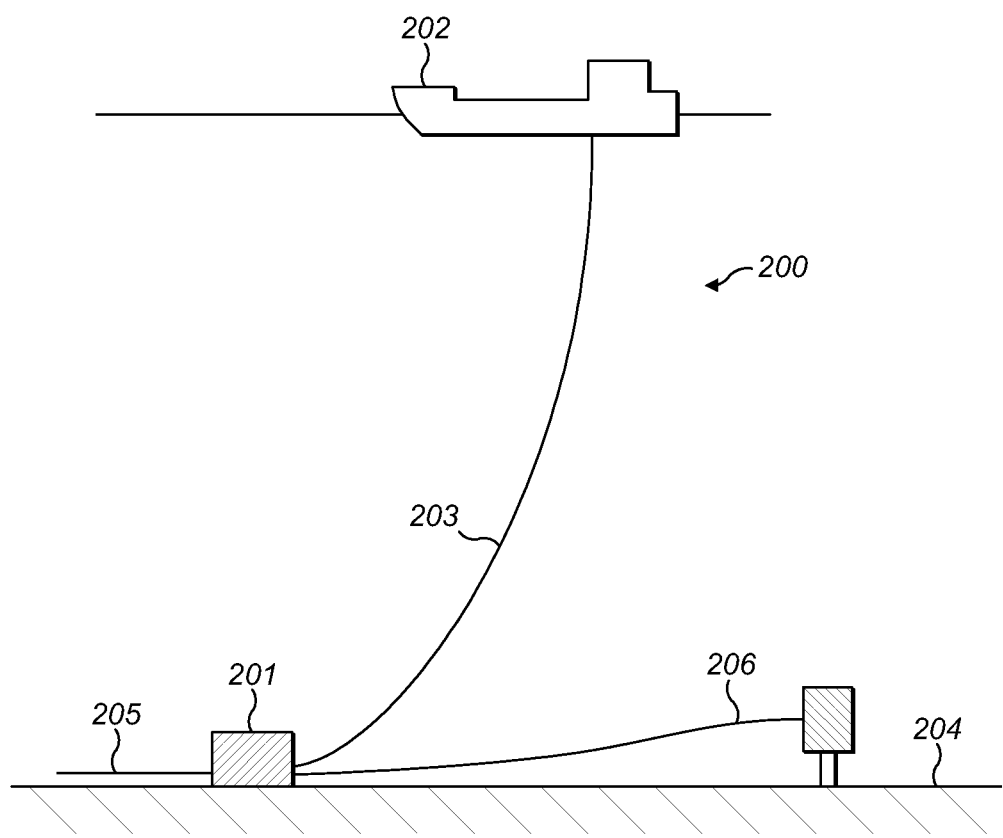
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
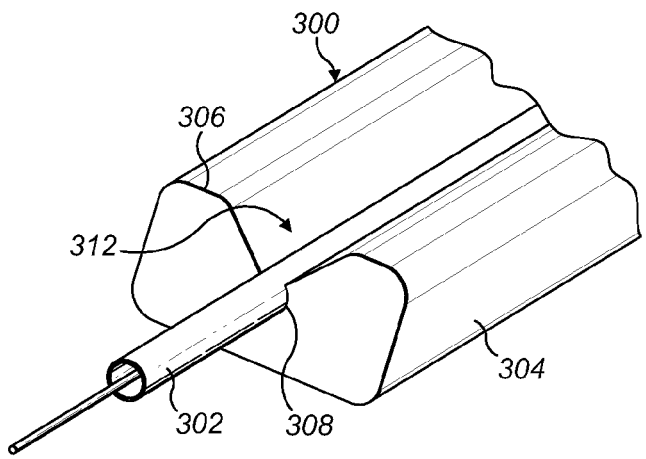
FIG. 3 illustrates a sheath apparatus for housing a cable or tube.
Figure 4:
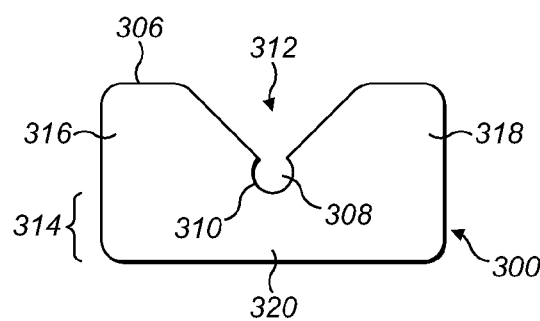
FIG. 4 illustrates a cross section of the apparatus of FIG. 3.

FIG. 3 illustrates a sheath apparatus 300 for housing a tube or cable (e.g. a FIMT) 302 in accordance with an embodiment of the present invention. The sheath apparatus 300 is an elongate member formed from an extruded or injection moulded polymer (for example HDPE) in this embodiment. FIG. 4 illustrates a cross-sectional view of the sheath apparatus 300 (without the FIMT).

More specifically, the sheath 300 includes a body portion 304, having an outer surface 306. The body portion 304 is approximately rectangular in cross-section, with some particular modifications described below, and has a substantially constant cross-section (i.e. a prism).

A function of the sheath apparatus 300 is to house a tube or cable (e.g. FIMT 302) and allow that tube or cable to perform sensing functions when incorporated into a flexible pipe body. Aptly, the sheath apparatus 300 has overall dimensions (width, length and depth) substantially similar or equal to the overall dimensions of a tensile armour wire of a flexible pipe body. Then, the sheath 300 housing the tube or cable may be used to replace a tensile armour wire when forming a flexible pipe body. Alternatively, the sheath apparatus may be introduced in a space between adjacent armour wires of a flexible pipe body.

The body portion 304 includes a channel 308 for receiving the FIMT 302 within the body portion. The channel 308 extends continuously along the body portion and defines an inner surface 310 of the body portion, approximately semi-circular in cross-section, or somewhat more circular than semi-circular (i.e. between circular and semi-circular), for contacting the FIMT and holding the FIMT in position. The FIMT 302 and the sheath apparatus 300 may be manufactured together as a unit, or the sheath may be manufactured separately to the FIMT, and the FIMT inserted into the channel 308.

The channel 308 is not entirely enclosed by the body portion 304. Rather, in this embodiment, the channel 308 is exposed by an opening 312 that connects the channel with the outer surface 306. The opening also extends continuously along the elongate body portion. The opening 308 is approximately triangular in cross-sectional shape, with a narrower section close to the channel, extending to become wider close to the outer surface 306. This arrangement may assist in enabling a FIMT to be readily inserted into the channel during production.

By providing the channel 308 and opening 312, the body portion 304 effectively has a cross-sectional shape having a base portion 314, first and second lobes 316, 318 extending from the base portion 314, and a central portion 320 of the base portion between the first and second lobes, where the central portion extends less than the lobes.

Figure 5:
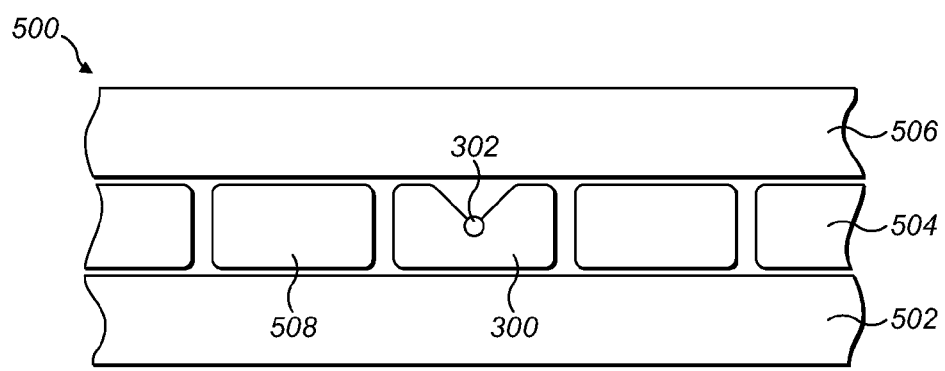
FIG. 5 illustrates a cross section of a flexible pipe body.
Figure 6:
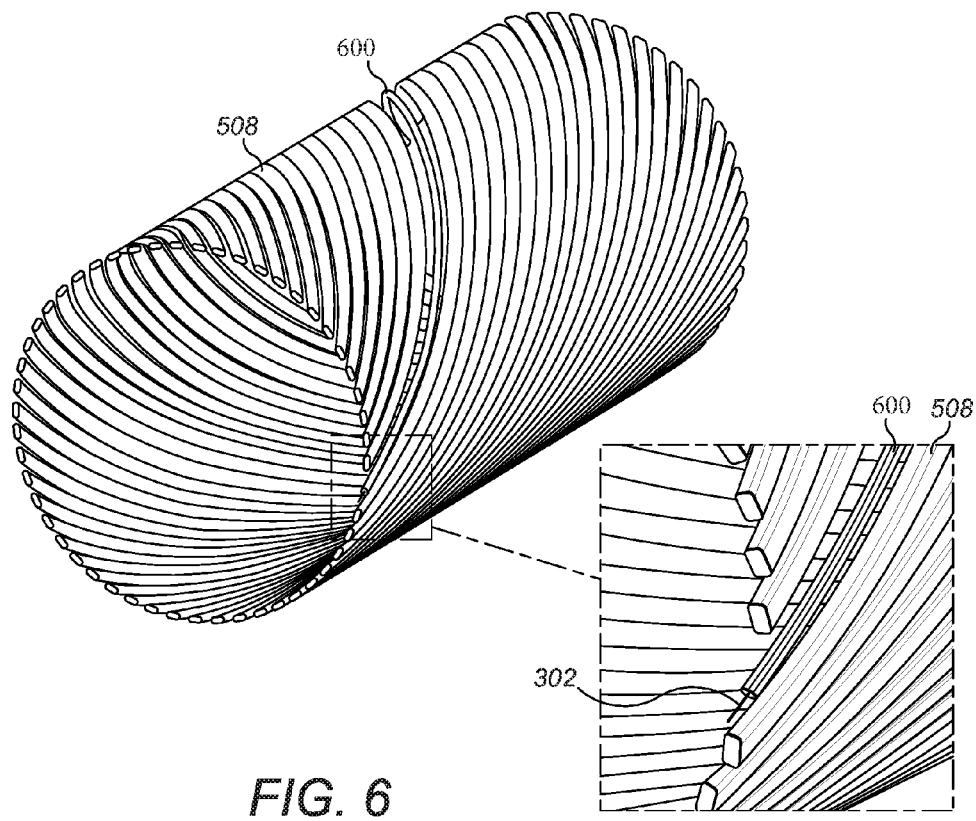
FIG. 6 illustrates a tensile armour layer.

FIG. 5 shows the cross-section of a portion of a flexible pipe body 500. The pipe body 500 includes a fluid retaining layer 502, a tensile armour layer 504 over the fluid retaining layer and an outer sheath 506 over the tensile armour layer. Of course other layers, such as any or all of those described with reference to FIG. 1 may be present. FIG. 6 illustrates the general formation of the armour wires 508 and tube- or cable-containing sheath apparatus 600 without the adjacent layers 502, 506.

The fluid retaining layer 502 may be provided initially by extrusion of a polymeric tubular conduit, in a manner known to those skilled in the art. Then, a tube- or cable-containing sheath apparatus is wrapped alongside tensile armour wires, in the same manner as the tensile armour wires, helically around the fluid retaining layer 502. Here the tube- or cable-containing sheath apparatus is effectively a replacement, taking the position of, one of the tensile armour wires. Aptly the tube- or cable-containing sheath apparatus is resistant to crushing, close to or as strong as a tensile armour wire, and resistant to deformation.

An outer sheath 506 may then be extruded over the tensile armour layer 504 in a manner known to those skilled in the art.

Upon formation of the pipe body 500, layers are generally sequentially terminated in an end fitting (not shown). The tube- or cable-containing sheath apparatus 300 is therefore dealt with similarly to its surrounding armour wires 508, although it may be protruded from the end fitting so as to enable connection to an interrogation device (sensor monitoring unit).

The finished pipe assembly (flexible pipe) can then be used for fluid transport, whilst being continually or periodically monitored for strain, temperature, fluid entry, etc. Readings could be linked to an alarm system to notify users in the event of an adverse reading outside predetermined acceptable limits.

Because of the location of the channel 308 and opening 312, the channel is located within the outer boundaries of the body portion. That is, a tube or cable held in the channel will not extend further than the outer surface of the body portion (in cross-section). Therefore, a tube or cable held in the channel will be isolated from any adjacent structure to the sheath apparatus that may contact the body portion. The tube or cable will therefore benefit from protection from the adjacent structure. Aptly, if the tube/cable functions to send or receive an electrical signal, the tube/cable is also electrically isolated from the adjacent structure. It will thus be appreciated that the channel and opening need not be located precisely as shown in FIG. 4 in order to achieve these benefits.

Because of the continuous opening 312, a fluid to be sensed has access to the tube/cable along the full length of the tube/cable. That is, if the tube/cable 312 is used to detect the presence of water, for example (such as in the event of a pipe breach), then the tube/cable may be used to detect the particular location of the fluid along the length, and remedial action may be taken (such as repair of the breach at that location).

With the arrangement as shown in FIGS. 3 and 4, the cross-sectional shape lends itself to subsequent insertion of a tube/cable to the body portion after manufacture. In particular, if the body portion is formed from a material that has a degree of flexibility, the relatively thinner portion 320 will allow the relatively thicker portions 316, 318 to be pushed apart slightly to let the tube/cable to be more easily received in the channel 308. Aptly, the body portion may be formed from a polymer or composite material, such as PP, PS, PET, HDPE, PVDF, PA-11, PA-12, PEX, PEEK, PFA, PVC, PTFE silicon rubber, GFRP, CFRP, or a mixture thereof. Aptly, the body portion may be formed from a material having a Young's modulus of elasticity of around 0.01 to 200 GPa, and advantageously in the range 0.2 to 50 GPa.

It will be appreciated that the material used for the body portion will require properties to suit the manufacturing conditions and the field of use (e.g. operating temperatures) for example. A skilled person will appreciate that PA-11 can be used for operating temperatures of up to around 80° C., with an elongation at break of around 23%. Silicon rubber can be used for higher temperatures of between around −60° C. to 230° C. with an elongation at break of 300%. The material properties can be determined by a skilled person to suit the requirements of use.

In addition, the body portion 304 may aptly be formed of an insulative material, such as a syntactic foam. The sheath apparatus then provides partial thermal isolation from the surrounding structure.

It is noted that, if the opening 312 is provided to face the radially outer portion of a flexible pipe body, thermal flow or detection is effectively focused in the direction of the opening. Here the FIMT may be sensitive to temperature changes emanating from the outer surface of the flexible pipe. Likewise, the opening may be located to face one or more other directions or extend helically to face all directions.

Figure 7:
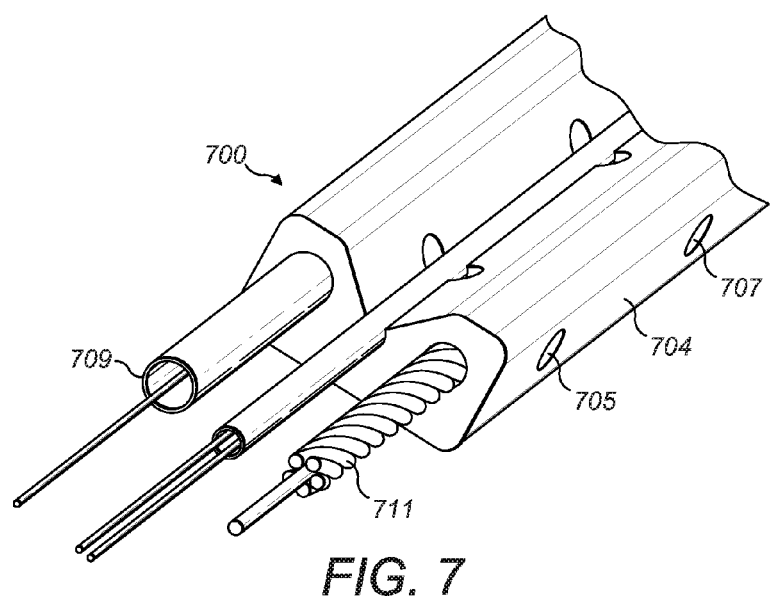
FIG. 7 illustrates another sheath apparatus for housing cable(s) or tube(s).
Figure 8:
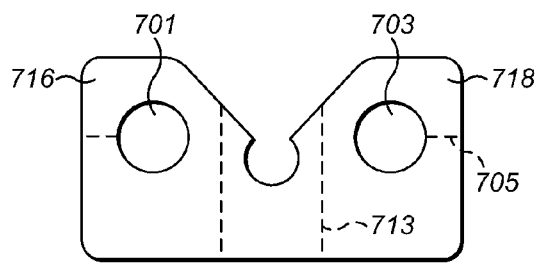
FIG. 8 illustrates a cross section of the apparatus of FIG. 7.

Another embodiment of the invention is illustrated in FIGS. 7 and 8. The sheath apparatus 700 shares many features with the sheath apparatus 300, and like features will not be fully described here for brevity.

The sheath apparatus 700 includes a body portion 704 including two enclosed channels 701, 703 running though the body portion in the lobe areas 716, 718. The channels 701, 703 are suitable for housing further sensing tubes or cables. Also, there are provided periodically spaced transversely extending through-side holes 705, 707 for allowing fluidic access from the side of the sheath apparatus to the sensing tube/cable at predetermined intervals. It will be appreciated that the transversely extending through-side holes are optional, which may depend on whether the sensing tube/cable requires fluidic contact from that direction (and whether the sensor is sensing a fluid presence). Here the sensors to be housed in the sheath apparatus 700 are a FIMT 709 and a coaxial cable 711. There may be additionally or alternatively through thickness holes 713 to ensure flow of fluid around the sensor tube or cable periodically from below the body as well as from above. The sizing of the holes may be suitably only 10% of the diameter of the sensing tube or cables diameter or up to more than 150% times the diameter of the sensing tube or cables.

It will be appreciated that the distance of the periodically spaced radially extending through holes 705, 707 and 713 can be determined to suit the particular application. For example, if a cable is housed for detecting the presence of seawater, then the distance between holes can be determined depending on the degree of accuracy required by the cable. For example, it may be necessary to space the through holes only every 1 meter or 5 meters for a flexible pipe that extends deep under the sea. Other applications may require a closer distance for increased accuracy or improved fluid flow to the sensor tube or cable. If required, the direction that the through holes are extending can be determined to suit the application. A through hole may be provided to face a specific direction of thermal flow or detection for example. Alternatively through holes may be provided at different frequency radially to that transversely in order to optimise the sensing capabilities of the system (such as for example one through thickness hole for every 10 through-side holes). The spacing may be determined to account for different expected fluid flow rates.

In addition, through hole spacing and size may be determined to suit the expected level of fluid flow across the sheath apparatus. The outside diameter of the tube/cable may be used to determine the spacing and the radial holes may be of a different size to the transverse holes.

Figure 9:
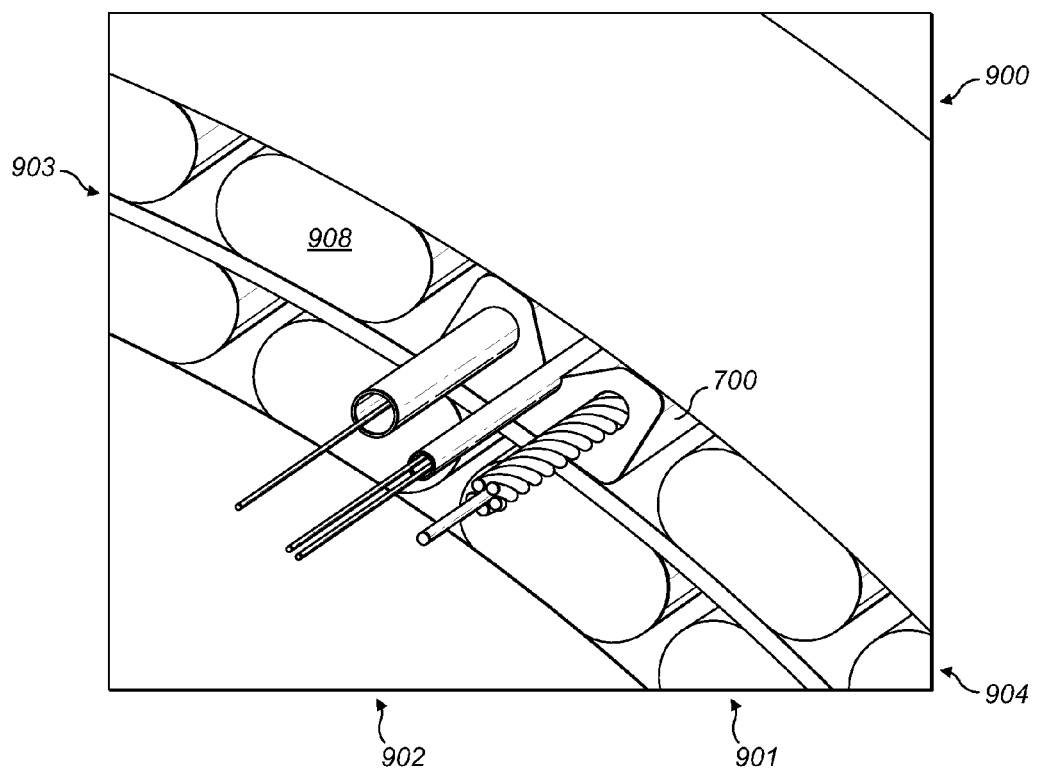
FIG. 9 illustrates a cutaway flexible pipe body.

FIG. 9 illustrates a view of the apparatus 700 located in position in a flexible pipe body 900 adjacent to tensile armour wires 908. Here the tensile armour layer 904 is provided adjacent a further tensile armour layer 901 with a tape layer 903 separating each armour layer. The armour layers 901, 904 are sandwiched between an inner fluid retaining layer 902 and an outer sheath 906. The manufacture and use of the flexible pipe body may be similar to that described above in the first embodiment.

Various modifications to the detailed designs as described above are possible. For example, the precise shape and dimensions as discussed above are not always required, as long as the function(s) of the sheath apparatus is achieved. E.g. the overall cross-sectional shape may be generally oval or round or another shape; the opening need not widen but may be constant or have varying diameter.

Whilst the embodiments described above have included a continuous opening for connecting the FIMT-receiving channel with the outer surface of the body portion, the opening may instead be a plurality of discrete openings at predetermined positions along the body portion. In this way, the location along the length of a fluid contacting the tube/cable may still be ascertained.

The apparatus may itself comprise a number of body portions, which can be connected to a tube or cable but separated from each other. The body portions act as spacer elements, and allow fluidic access to the tube or cable being housed in the areas therebetween.

Injection moulded sections may be unconnected or connected (glued, welded or clipped) together to create a sheath apparatus of substantial length, for instance 500 m or longer, from moulded sections of much shorter length, for instance 0.5 meters.

The cross-sectional shape of the sheath apparatus may vary. For example the opening may be a single continuous opening, but that opening may extend in a helical manner along the length of the elongate body portion.

The sheath apparatus may include additional features, such as a silicon coating to act as a protective layer against high temperatures.

With the above-described arrangement, sensing cables, tubes, FIMTs and the like may be readily incorporated into the structure of a flexible pipe body. As such, continuous or periodic monitoring of different parameters relating to the flexible pipe may be performed during the lifetime of the pipe.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A flexible pipe body comprising a tensile armour layer, the tensile armour layer comprising tensile armour wires and a sheath apparatus for housing tubes and/or cables, the sheath apparatus incorporated into the flexible pipe body and located between adjacent tensile armour wires of the flexible pipe body, the sheath apparatus comprising:
   an elongate body portion, comprising an outer surface and a channel for receiving a tube or cable within the body portion, and further comprising at least one opening connecting the channel and the outer surface,
   wherein the at least one opening comprises a continuous opening extending along the elongate body portion and the body portion of the sheath apparatus further comprises a plurality of discrete openings at predetermined positions along the elongate body portion of the sheath apparatus connecting the channel and the outer surface,
   wherein the channel defines an inner surface of the body portion for contacting the tube or cable,
   wherein the sheath apparatus is arranged to electrically isolate a tube or cable from an adjacent structure contacting the body portion, and
   wherein the body portion of the sheath apparatus is of an insulative material.

2. A flexible pipe body as claimed in claim 1, wherein the body portion of the sheath apparatus is of a polymer or a composite material.

3. A flexible pipe body as claimed in claim 1, wherein the body portion material of the sheath apparatus has a Young's modulus of between 0.01 and 200 GPa.

4. A flexible pipe body as claimed in claim 1, wherein the sheath apparatus has a cross section having width and length dimensions substantially equal to the width and length dimensions of the cross section of a tensile armour wire of the flexible pipe body, and in the range 2 to 8 mm thick and 5 to 18 mm wide.

5. A flexible pipe body as claimed in claim 1 wherein the at least one opening widens from the channel to the outer surface.

6. A flexible pipe body as claimed in claim 1, wherein the at least one opening extends helically along the body portion of the sheath apparatus.

7. A flexible pipe body as claimed in claim 1 wherein the body portion of the sheath apparatus further comprises one or more further channel(s), for respectively receiving one or more further tube(s) or cable(s) within the body portion.

8. A flexible pipe body as claimed in claim 1, the sheath apparatus further comprising further elongate body portions for housing further tubes or cables.

9. A flexible pipe body as claimed in claim 1 further comprising a tube or cable housed in the body portion of the sheath apparatus.

10. A flexible pipe body as claimed in claim 1, the sheath apparatus further comprising a silicon coating over the outer surface of the body portion.

11. A method of manufacturing a flexible pipe body comprising a tensile armour layer comprising tensile armour wires and a sheathed tube or cable, comprising:
   forming a sheath apparatus by forming an elongate body portion, comprising an outer surface, a channel, and at least one opening connecting the channel and the outer surface, wherein the at least one opening comprises a continuous opening extending along the elongate body portion and the body portion of the sheath apparatus further comprises a plurality of discrete openings at predetermined positions along the elongate body portion of the sheath apparatus connecting the channel and the outer surface, and wherein the channel defines an inner surface of the body portion;
   inserting a tube or cable into the channel to contact the inner surface of the body portion;
   helically winding the sheathed tube or cable directly or indirectly over a fluid retaining layer and locating the sheath apparatus between adjacent tensile armour wires of the flexible pipe body,
   wherein the sheath apparatus is arranged to electrically isolate a tube or cable from an adjacent structure contacting the body portion, and
   wherein the body portion of the sheath apparatus is of an insulative material.

* * * * *